United States Patent
Panzica et al.

(10) Patent No.: US 11,921,655 B2
(45) Date of Patent: Mar. 5, 2024

(54) DYNAMIC MEMORY PROTECTION DEVICE SYSTEM AND METHOD

(71) Applicant: STMICROELECTRONICS, INC., Coppell, TX (US)

(72) Inventors: Massimo Panzica, Andover, MA (US); Maurizio Gentili, San Jose, CA (US)

(73) Assignee: STMICROELECTRONICS, INC., Coppell, TX (US)

( * ) Notice: Subject to any disclaimer, the term of this patent is extended or adjusted under 35 U.S.C. 154(b) by 264 days.

(21) Appl. No.: 17/307,893

(22) Filed: May 4, 2021

(65) Prior Publication Data
US 2022/0358062 A1 Nov. 10, 2022

(51) Int. Cl.
*G06F 13/28* (2006.01)
*G06F 13/24* (2006.01)
*H04L 9/32* (2006.01)

(52) U.S. Cl.
CPC .............. *G06F 13/28* (2013.01); *G06F 13/24* (2013.01); *H04L 9/3247* (2013.01); *G06F 2213/24* (2013.01); *G06F 2213/28* (2013.01)

(58) Field of Classification Search
CPC ...... G06F 13/28; G06F 13/24; G06F 2213/28; H04L 9/3247
See application file for complete search history.

(56) References Cited

U.S. PATENT DOCUMENTS

| | | | |
|---|---|---|---|
| 7,130,951 B1 | 10/2006 | Christie et al. | |
| 7,849,310 B2 | 12/2010 | Watt et al. | |
| 7,890,753 B2 | 2/2011 | Dahan et al. | |
| 10,783,240 B2 | 9/2020 | Gentili et al. | |
| 2004/0205203 A1* | 10/2004 | Peinado | G06F 12/1425 |
| | | | 711/E12.099 |
| 2008/0222663 A1* | 9/2008 | Carpenter | G06F 12/145 |
| | | | 726/1 |
| 2009/0204823 A1 | 8/2009 | Giordano et al. | |
| 2014/0359788 A1 | 12/2014 | Laine et al. | |
| 2017/0289151 A1 | 10/2017 | Shanahan et al. | |
| 2017/0351878 A1* | 12/2017 | Conti | G06F 21/85 |
| 2019/0095623 A1 | 3/2019 | Narasimhan et al. | |

(Continued)

OTHER PUBLICATIONS

ARM®, "Cortex-M4," Technical Reference Manual, revision r0p0, 2009, 117 pages.

(Continued)

*Primary Examiner* — Ali S Abyaneh
(74) *Attorney, Agent, or Firm* — Seed IP Law Group LLP

(57) ABSTRACT

A microcontroller includes a memory, direct memory access (DMA) controllers and a microprocessor. The microprocessor maintains one or more memory protection (MP) configurations to control access to protected memory areas of the microcontroller. In response to a secure service call of an unsecure user-application, the microprocessor executes a state machine which disables interrupt requests, determining whether DMA controller configurations and MP configurations satisfy secure-service criteria. When the secure-service criteria are satisfied, at least one secure operation associated with the secure service call is performed, and memory areas accessed during the execution of the at least one secure operation are cleaned. The interrupt requests are re-enabled and a response to the secure service call is generated.

30 Claims, 5 Drawing Sheets

(56) References Cited

U.S. PATENT DOCUMENTS

2019/0102538 A1* 4/2019 Gentili .................... G06F 21/53
2020/0380116 A1 12/2020 Gentili et al.

OTHER PUBLICATIONS

*ARM® Architecture Reference Manual*, ARMv7-A and ARMv7-R edition, ARM Limited, Cambridge, England, 2018, 2720 pages.
Guillen et al., "Crypto-Bootloader—Secure in-field firmware updates for u ultra-low power MCUs," Texas Instruments, 2015, 12 pages.
Jing et al., "Design and Implementation of Security OS Based on TrustZone," 11th International Conference on Electronic Measurement & Instruments, Aug. 16-19, 2013, Harbin, China, pp. 1027-1032.
Ngabonziza et al., "TrustZone Explained: Architectural Features and Use Cases," 2nd International Conference on Collaboration and Internet Computing, Nov. 1-3, 2016, Pittsburgh, PA, pp. 445-451.
Sanfilippo, "Security with STM32& Secure Elements," STMicroelectronics, STM32, Mar. 7, 2016, 26 pages.
STMicroelectronics NV, "Proprietary code read out protection (PCROP) on STM32F72xxx and STM32F73xxx microcontrollers," Application note AN4968, Feb. 2017, 46 pages.
STMicroelectronics NV, "Proprietary code read-out protection (PCROP), software expansion for STM32Cube," data brief X-CUBE-PCROP, Jan. 2017, 3 pages.
STMicroelectronics NV, "Proprietary code read-out protection on microcontrollers of the STM32F4 Series," Application note 4701, Nov. 2016, 38 pages.
STMicroelectronics NV, "STM32L0/L4 Firewall overview," Application note AN4729, Aug. 2015, 3 pages.
STMicroelectronics NV, "STM32L100xx, STM32L151xx, STM32L152xx and STM32L162xx advanced ARM®-based 32-bit MCUs," Reference Manual RM0038, Sep. 2016, 908 pages.
STMicroelectronics NV, "Ultra-low-power STM32L0x1 advanced ARM®-based 32-bit MCUs," Reference Manual RM0377, Feb. 2016, 874 pages.
Stmicroelectronics, "IoT Security Good practice," Secure MCUs Division, Nov. 2016, 15 pages.
Stmicroelectronics, "Proprietary Code Read Out Protection on STM32L1 microcontrollers," Application note AN4246, Apr. 2013, 11 pages.
Stmicroelectronics, "ST Technology Tour Invitiation," informational flyer, 2017, 8 pages.
Stmicroelectronics, "STM32 St-Link Utility software description," User Manual UM0892, May 2014, 41 pages.
Stmicroelectronics, "System Memories Protections," STM32L4, Revision 1.0, 18 pages.
Waskiewicz, "Platform Level Security For IoT Devices," STMicroelectronics, Technology Tour 2017, 63 pages.

* cited by examiner

DYNAMIC MEMORY PROTECTION DEVICE SYSTEM AND METHOD

BACKGROUND

Technical Field

The present disclosure generally relates to microcontrollers of the type often used in embedded applications. More particularly, but not exclusively, the present disclosure relates to securing microcontroller operations.

Description of the Related Art

Microcontrollers are a class of integrated circuits that contain a microprocessor and at least some memory in an integrated circuit package. In some cases, all of the memory that is accessible by the microprocessor is contained within the integrated circuit package. In other cases, a first portion of memory is contained in the integrated circuit package, and a second portion of memory is outside of the integrated circuit package and accessible to the microprocessor via one or more data paths (e.g., buses).

In a microcontroller, a microprocessor may be arranged for data communications with the memory according to a memory map. Each structure, device, and other such means of memory, which includes volatile memory such as random access memory (RAM), non-volatile memory such as flash memory, optional other memory-type circuitry, memory protection logic, and firewall logic may be addressed according to its respective assignment in the memory map. A microcontroller typically also includes input/output (I/O) circuitry, administrative function circuitry, interrupt circuitry, and direct memory access (DMA) circuitry.

In addition to a microprocessor and memory, microcontrollers will also typically include at least one input/output (I/O) control circuit. The I/O control circuitry provides the microcontroller with an architecture for interacting with the outside world. Via the I/O control circuitry, any number and any type of input device may be electrically coupled to the microcontroller to provide data for processing by the microprocessor. Along these lines, the I/O control circuitry may also be arranged to pass data generated by the microcontroller to the outside world.

Microcontrollers may be found in retail devices, consumer devices (e.g., smart phones, laptops, etc.), industrial equipment, medical devices, vehicles, and devices of nearly any other class or technology area. The devices may be battery powered or powered by a hard-wired source. The devices where microcontrollers are employed may be portable, fixed, or some combination thereof. Without any limitation, microcontrollers are used to take data from sensors of all types (e.g., temperature, time, humidity, acceleration, motion, switches, triggers, and the like), and microcontrollers are used to provide data to the outside world (e.g., visual, audio, and haptic annunciators, switches, triggers, and the like).

FIG. 1 is a block diagram showing a conventional microcontroller architecture 10. In the microcontroller 10, a microprocessor 12 exchanges data communications with memory 14. Memory 14 includes physical memory and the control circuitry to pass information into and from the physical memory to other circuits of microcontroller 10. Memory 14 may optionally also include other circuits that are accessed using a memory-style interface. The physical memory of memory 14 may be volatile memory or non-volatile memory. The memory 14 illustrated in FIG. 1 includes random access memory (RAM) 14a, flash memory 14b, and optional other circuits 14c coupled via a memory-style interface. As illustrated, each of the types of memory, RAM 14a, flash 14b, and optional other circuitry 14c, is located onboard the microcontroller 10. As represented by the dashed lines, each of the types of memory may also be or have a portion that is external to the integrated circuit package of microcontroller 10.

The microprocessor 12 and the memory 14 of microcontroller 10 are organized according to a memory space that has a determined "width." The "width" is often based on how much data a given microprocessor 12 can concurrently process, and along these lines, the "width" is often mirrored by the number of "bits" concurrently passed over one or more buses that move data within the microcontroller 10.

In the illustration of FIG. 1, the microcontroller 10 has a 32-bit wide architecture. Considering that each unique address in a physical memory device is typically arranged to store a single byte of data, the 32-bit wide architecture can uniquely address four gigabytes (4 GB) of data. This architecture is illustrated in FIG. 1 as a memory map 16 that spans the entire 4 GB of addressable space. Stated differently, using hexadecimal notation, the individual addresses of the memory map 16 may count from 0x0000-0000 to 0xFFFF-FFFF (for example, 0 to 4,294,967,295 in decimal (base-10) notation).

The microprocessor 12 of microcontroller 10 may address any bit, nibble, byte, half-word, word, double-word, quad-word, or the like in the memory map 16. If a system engineer locates a device (e.g., a memory, a PCI-bus, a USB host controller, or the like) on a 32-bit memory bus, and if the device has its own individual or set of 32-bit addresses, then the microprocessor 12 will be able to access the device by placing a set of data bits representing the device address on the 32-bit memory bus. In the microcontroller 10, typically every one of the unique addresses in the memory map 16 are accessible by the microprocessor 12.

The microcontroller 10 of FIG. 1 includes I/O circuitry 18, administrative circuits 20, interrupt processing circuitry 22, direct memory access (DMA) circuitry 24 also referred to as a DMA controller, and optionally other circuits too (not shown). The I/O circuitry 18 operates as described herein to receive data from the outside world and to provide data to the outside world.

The administrative circuitry 20 may include any number of logic modules. The logic modules may be arranged to include or otherwise manage clocks, oscillators, timers, power modes, an audio interface, analog/digital features (e.g., an analog-to-digital controller (ADC); a digital-to-analog controller (DAC)), communication interfaces, debug interfaces, and the like.

The interrupt processing circuitry 22 processes planned and unplanned interruptions to normal processing by the microprocessor 12. The interrupts may be synchronous or asynchronous to a system clock. Examples of planned interruptions include expiring timers, certain I/O control circuit inputs (e.g., keypresses, serial or parallel incoming data, and the like). Examples of unplanned interrupts include imminent loss of power interrupts, resets, error traps, watchdog timeouts, and the like.

The DMA circuitry 24, which may comprise one or more DMA controllers, operates to copy data from one location in the microcontroller 10 to another location without using the microprocessor 12 to execute the copying. For example, data stored in one area of RAM 14a may be copied to another area of RAM 14a by loading various registers of the DMA circuitry 24. Except for setting the registers with appropriate values, the copying operation happens autonomously without any further intervention from the microprocessor 12. Typically, the DMA circuitry 24 is used to copy large amounts of data. In another example, the other circuitry 14c includes a universal serial bus host controller. In this example, the DMA circuitry 24 may be used to copy bulk data between the USB host controller of the other circuitry 24 and the RAM 14a.

BRIEF SUMMARY

In an embodiment, a microcontroller comprises a memory, one or more direct memory access (DMA) controllers coupled to the memory, and a microprocessor coupled to the memory. The microprocessor, in operation: maintains one or more memory protection (MP) configurations to control access to protected memory areas of the microcontroller; executes an unsecure user-application; and responds to a secure service call of the executing unsecure user-application. The responding to the secure service call includes disabling interrupt requests; determining whether one or more DMA controller configurations satisfy DMA secure-service criteria associated with the secure service request; determining whether one or more MP configurations satisfy MP secure-service criteria associated with the secure service request; in response to determining the DMA secure-service criteria and the MP secure-service criteria are satisfied: executing at least one secure operation associated with the secure service call, the at least one secure operation accessing at least one protected memory area; and cleaning one or more memory areas accessed during the execution of the at least one secure operation; and enabling the interrupt requests.

In an embodiment, a method comprises: maintaining, under control of a microprocessor of a microcontroller having a memory and one or more direct memory access controllers, one or more memory protection (MP) configurations to control access to protected memory areas of the microcontroller; executing an unsecure user-application; and responding, under control of the microprocessor, to a secure service call of the executing unsecure user-application. The responding includes disabling interrupt requests; determining whether one or more DMA controller configurations satisfy DMA secure-service criteria associated with the secure service request; determining whether one or more MP configurations satisfy MP secure-service criteria associated with the secure service request; in response to determining the DMA secure-service criteria and the MP secure-service criteria are satisfied: executing at least one secure operation associated with the secure service call, the at least one secure operation accessing at least one protected memory area; and cleaning one or more memory areas accessed during the execution of the at least one secure operation; and enabling the interrupt requests.

In an embodiment, a system comprises: a system bus; one or more functional circuits coupled to the system bus; and a microcontroller coupled to the system bus. The microcontroller includes: a memory; one or more direct memory access (DMA) controllers coupled to the memory; and a microprocessor coupled to the memory. The microprocessor, in operation: maintains one or more memory protection (MP) configurations to control access to protected memory areas of the microcontroller; executes an unsecure user-application; and responds to a secure service call of the executing unsecure user-application. The responding includes, under control of the microprocessor: disabling interrupt requests; determining whether one or more DMA controller configurations satisfy DMA secure-service criteria associated with the secure service request; determining whether one or more MP configurations satisfy MP secure-service criteria associated with the secure service request; in response to determining the DMA secure-service criteria and the MP secure-service criteria are satisfied: executing at least one secure operation associated with the secure service call, the at least one secure operation accessing at least one protected memory area; and cleaning one or more memory areas accessed during the execution of the at least one secure operation; and enabling the interrupt requests.

In an embodiment, a non-transitory computer-readable medium's contents configure a microcontroller to perform a method. The method includes: maintaining, under control of a microprocessor of the microcontroller, the microcontroller having a memory and one or more direct memory access controllers, one or more memory protection (MP) configurations to control access to protected memory areas of the microcontroller; executing an unsecure user-application; and responding, under control of the microprocessor, to a secure service call of the executing unsecure user-application. The responding includes: disabling interrupt requests; determining whether one or more DMA controller configurations satisfy DMA secure-service criteria associated with the secure service request; determining whether one or more MP configurations satisfy MP secure-service criteria associated with the secure service request; in response to determining the DMA secure-service criteria and the MP secure-service criteria are satisfied: executing at least one secure operation associated with the secure service call, the at least one secure operation accessing at least one protected memory area; and cleaning one or more memory areas accessed during the execution of the at least one secure operation; and enabling the interrupt requests.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views, unless the context indicates otherwise. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which.

DETAILED DESCRIPTION

Figure 1:
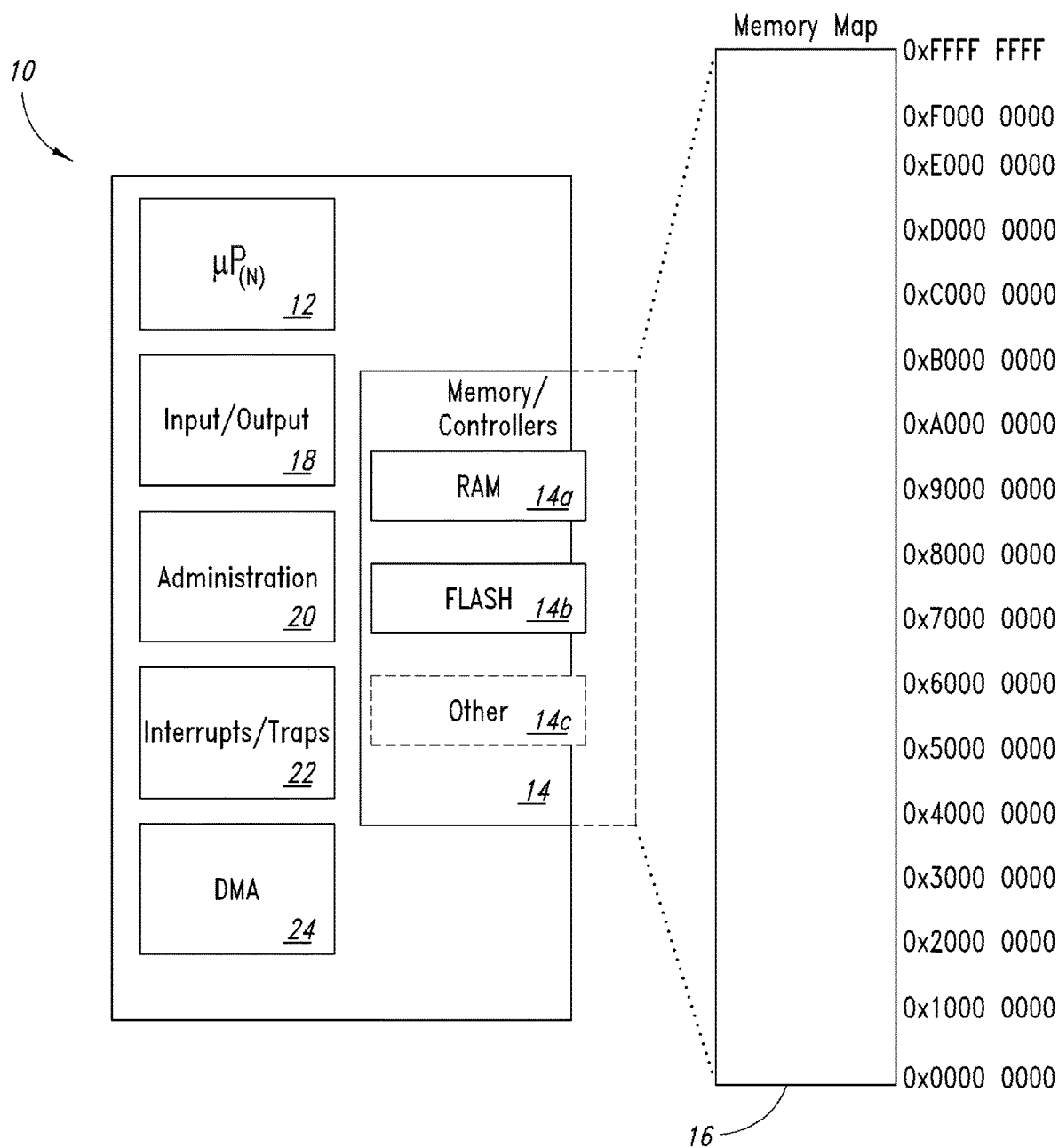
FIG. 1 is a block diagram showing a conventional microcontroller architecture.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing systems including client and server computing systems, as well as networks have not been shown or described in detail to avoid unnecessarily obscuring descriptions of the embodiments.

Many microcontroller design companies employ particular mechanisms to reduce the success rate of hacking attacks. In many cases, these particular mechanisms include "secure key" operations that are used to combat pirate clone attacks, unauthorized data copying attacks, and attacks that falsely authenticate malicious program instructions or data. One reason that secure keys are employed to prevent malicious software intrusion into the microcontroller is that some data suggests up to 95% of the attacks on microcontrollers are directed towards the software currently in use by the microcontroller.

Secure key operations, however, as conventionally deployed, have shortcomings. For example, the secure keys used to decode or encrypt data are often implemented with an additional microcontroller that is dedicated to security. While such an approach is effective, the additional microcontroller is financially expensive, resource expensive, and area expensive. That is, adding additional computing and support circuitry raises the price of each end product where the microcontroller is deployed, the additional computing and support circuitry takes up space in already-crowded integrated circuits and on already-crowded circuit boards, and the additional computing and support circuitry requires power. Other protection schemes may be employed, such as a firewall.

Other protection schemes may establish a secure environment, also called a memory protection unit (MPU), within otherwise conventional, unprotected memory. After the secure environment is created, secure keys or any other secret data, secret algorithms, or the like can be uploaded into the secure environment. The secret data can then be used. After the use is completed, any otherwise unprotected memory, registers, or the like are cleared, and upon clearing these otherwise unprotected resources, other non-secure application software can be executed by the microcontroller in a conventional manner. A conventional secure environment disables certain functions of the microcontroller, including operations of the direct memory access (DMA) circuitry and operations of certain communications interfaces (e.g., universal serial bus (USB), peripheral component interface (PCI), and the like), while secure operations are performed. This inflexible approach severely limits performance of any other operations during execution of the secure operations, such as operations by a user application accessing non-secure memory areas.

Figure 2:
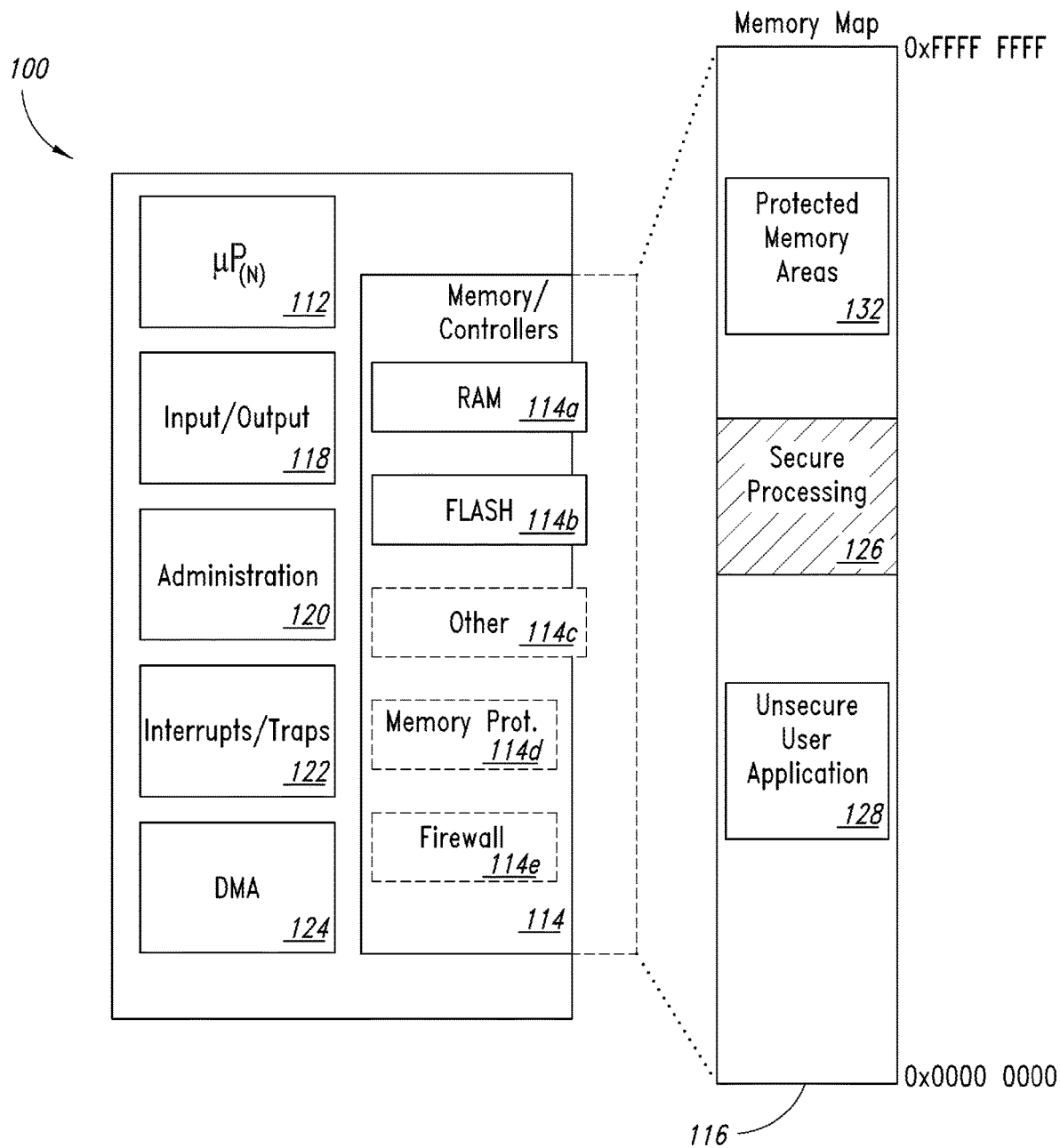
FIG. 2 is a block diagram showing an example microcontroller architecture configured to implement one or more embodiments of the present disclosure.

FIG. 2 is a block diagram showing a microcontroller 100 configured to implement a secure processing environment 126. Microcontroller 100 is formed in one or more embodiments as a collection of electronic structures in a single integrated circuit package (an integrated circuit). In some embodiments, the structures of microcontroller 100 may be formed in two or more integrated circuit packages, and in some embodiments, discrete electronic devices and other circuitry are electrically coupled to microcontroller 100 to support various microcontroller functions. The electronic structures that make up microcontroller 100 may be formed with known silicon fabrication processes or other semiconductor manufacturing processes.

In microcontroller 100, a microprocessor 112 is arranged for data communications with memory 114, according to a memory map 116. Each structure, device, and other such means of memory 114, which includes volatile memory such as random access memory (RAM) 114a, non-volatile memory such as flash memory 114b, optional other memory-type circuitry 114c, memory protection logic 114d, and firewall logic 114e, may be addressed according to its respective assignment in the memory map 116. Microcontroller 100 also includes input/output (I/O) circuitry 118, administrative function circuitry 120, interrupt circuitry 122, and direct memory access (DMA) circuitry 124, also referred to as DMA controller.

In the present disclosure, as in FIG. 2, the microprocessor 112 will be understood by one of ordinary skill in the art in a broad sense. The term "microprocessor" is used herein for brevity and to facilitate an efficient understanding of the subject matter in the present disclosure rather than to denote only a single device having a particular and specific architectural design. Accordingly, as used herein, a "microprocessor" means one or more microprocessors that operate independently, cooperatively, or both independently and cooperatively.

The microprocessor discussed herein may be formed as any one or more of a central processing unit, a graphics processing unit, a video processing unit, a digital signal processor (DSP), or another type of specialized processing unit. The microprocessor discussed herein may be a microprocessor, a processing core, an execution unity, a controller, a micro controller, processor, a state machine, an arithmetic logic unit (ALU), or another like electronic control circuitry means configured to execute programmed software instructions, or various combinations thereof. These programmed software instructions may be high-level software instructions, compiled software instructions, assembly-language software instructions, machine-code software instructions, object code, relocated or relocatable code, binary code, micro-code, or the like. The programmed software instructions may reside in internal or external memory 114 or they may be hard-coded as a state machine or set of control signals.

According to methods and devices referenced herein, one or more embodiments describe software executable by the processor, which when executed, carries out one or more method acts. Accordingly, the microprocessor of the present disclosure includes any electronic device, system, or part thereof that controls at least one operation, and such a device may be implemented in hardware, firmware, or software, or some combination of at least two of the same. The functionality associated with the microprocessor may be centralized or distributed, whether locally or remotely.

Memory 114 includes physical memory, mapped or otherwise virtual memory, one or more memory controllers, one or more memory buses, and other circuitry utilized so that the memory described in the present disclosure can cooperatively pass data between the microprocessor 112, the memory 114, and certain other circuits of the microcontroller 100. Data passed to and from the certain other circuits optionally includes circuits that are accessed using a memory-style interface as well as circuits that generate or receive control signals associated with memory functions.

The physical memory of memory 114 may be volatile memory or non-volatile memory. The memory 114 illustrated in FIG. 2 includes random access memory (RAM) 114a, which may be static RAM (SRAM), dynamic RAM (DRAM), or some other type of RAM. The volatile RAM 114a may comply with a synchronous memory access protocol, such as SDRAM, and in addition or in the alternative, the volatile memory may comply with an asynchronous protocol. The volatile memory may be organized as one or more types of cache memory physically located close to the microprocessor to reduce data transfer time and to predictively re-use data. In some embodiments, program instructions executed by the microprocessor 112 are stored in RAM 114*a*. Memory 114 may also include any form of erasable programmable read only memory (EPROM), which is illustrated in FIG. 2 as flash memory 114*b*. In some embodiments, the physical memory of memory 114 is accessed as virtual memory, and the virtual memory may be mapped to physical memory, an electronic device, or some other structure.

In the present disclosure, memory 114 may be used in one configuration or another. The memory may be configured to store data. In the alternative or in addition, the memory may be a non-transitory computer readable medium (CRM) wherein the CRM is configured to store instructions executable by microprocessor 112. These programmed software instructions may be stored individually or as groups of instructions in files. The files may include functions, services, libraries, and the like. The files may include one or more computer programs or may be part of a larger computer program. Alternatively or in addition, each file may include data or other computational support material useful to carry out the computing functions of the systems, methods, and apparatus described in the present disclosure.

For the sake of brevity, memory 114 is illustrated in FIG. 2 as including RAM and its associated control circuitry (RAM 114*a*), flash memory and its associated control circuitry (FLASH 114*b*), and other optional memory-type circuitry 114*c*, which may include memory, devices with a memory-type interface, associated control circuitry, and the like. Memory 114 also optionally includes memory protection logic 114*d* and firewall logic 114*e*. Each of RAM 114*a* and FLASH 114*b* is located onboard the microcontroller 100.

Optional other memory-type circuitry 114*c*, when included, may also be located onboard the microcontroller 100. The other memory-type circuitry 114*c* may comprise one or more registers, such as special function registers (SFRs). A register is a location in memory that data can be written to or data can be read from. SFRs on a microcontroller may be similar to registers in a data RAM. Data can be written to the registers as well as read from the registers. The SFRs may differ from data RAM registers as some SFRs may directly control the on-chip hardware on the microcontroller while others may be controlled by the on-chip hardware on the microcontroller, or both. Examples of SFR registers include: registers of peripheral circuits, such as a serial interface register which controls a serial interface of a microcontroller; hardware registers, such as a cryptographic circuit register which controls a cryptographic circuit of a microcontroller; registers associated with other sensitive peripheral or hardware circuits; etc.

The optional logic modules, memory protection logic 114*d* and firewall logic 114*e*, include special control registers, comparator circuitry, control circuits, and the like, which are located onboard the microcontroller 100.

As represented by the dashed lines of memory 114, each of the RAM 114*a*, FLASH 114*b*, and optional other memory-type circuitry 114*c* may also have a portion that is external to the integrated circuit package of microcontroller 100.

Microcontroller 100 of FIG. 2 includes I/O circuitry 118 to receive data from the outside world and to provide data to the outside world. I/O circuitry 118 may include any one or more of dedicated I/O circuits, specialized I/O circuits, general purpose I/O circuits (GPIO), and other types of I/O circuits. The I/O circuitry 118 provides microcontroller 118 with an architecture to interact with the outside world. Any number and any type of input device that is electrically coupled to microcontroller 100 may, via I/O circuitry 118, provide data to microprocessor 112. Along these lines, I/O circuitry 118 is also configurable to pass data in any desirable form from microcontroller 100 to the outside world. In some embodiments, the I/O circuitry 118 is coupled to other circuitry that provides an opportunity to enter a secure processing environment 126.

The administrative function circuitry 120 may include any number logic modules. For example, one of the logic modules of the administrative function circuitry 120 manages reset functions. The reset control circuitry may recognize any number of events that reset the microcontroller to a known initialization state. The known initialization state may be a hard-boot state, a soft-boot state, a low-power state, a standby state, a return from standby state, a watchdog timeout state, an external hardware reset state, a software reset state, a firewall protection state, or any other such reset event. Upon a particular reset, the microcontroller 100 will have a set of known values loaded into a set of known configurable registers. The set of known values and corresponding set of known configurable registers may be different for any one or more of the particular reset states discussed herein. In some embodiments, the known values are hard-wired, hard-coded, factory-set, circuit-board set (e.g., jumper wires, pin headers, or the like), or otherwise not available for change by a programmer or user of the microcontroller 100. In other embodiments some or all of the known values may be set at the time of manufacture, at the time of first use, or at any other time after a microcontroller 100 is put into service.

Another logic module of the administrative function circuitry 120 is a clock and timer control module. The clock and timer control module includes circuitry to control any one or more of general purpose timers, specialized clock and timer functions, basic timers, low power timers, oscillators, independent watchdog circuits, system window watchdog circuits, real-time clocks, relative-time clocks, time-in-service clocks, and other such clock and timer controls.

The administrative function circuitry 120 may include a power control module. The power control module may be arranged to control any number of power modes of microcontroller 100 including low power modes, full power modes, sleep modes, standby modes, and the like. The power control module may include automatic power scaling circuits (e.g., dynamic voltage scaling), controllable regulation circuits, loss-of-power circuits, and other related power control circuits. In some embodiments, the power control module is coupled to any one or more of the reset control circuitry, the clock and timer control module, and other modules of microcontroller 100.

In some embodiments, the administrative function circuitry 120 includes an analog/digital features module (e.g., an analog-to-digital controller (ADC); a digital-to-analog controller (DAC); comparator circuitry). In some embodiments, for example, the ADC circuitry includes a multi-bit (e.g., 8, 12, 16, 24, and the like) ADC that performs successive approximation conversions. DAC circuits, if such circuitry is included, may have a corresponding width or a different width. The analog/digital features may have one or more channels. In some embodiments, the analog/digital features module includes comparator circuitry. The comparator circuitry may be coupled ADC circuits, DAC circuits, timer circuits, reset circuits, input/output (I/O) circuits, and any number of other circuits. In some embodiments, the comparator is coupled to an encryption module (e.g., advanced encryption standard (AES), data encryption standard (DES), and the like). The encryption module may include dedicated hardware circuitry, isolated hardware circuitry, obfuscated hardware circuitry, or other types of hardware circuitry. The analog/digital features may be coupled to the power control module, the clock and timer control module, and other modules of microcontroller 100.

A communications module may be included in the administrative function circuitry 120. The communications module may include any number of sub-modules, interfaces, media controllers, or the like to provide communications architecture for microcontroller 100. For example, any number of universal asynchronous receiver/transmitter (UART) circuits may be included, and any number of synchronous receiver/transmitter circuits, serial peripheral interface (SPI) circuits, and inter-integrated circuit (I2C) circuits may alternatively or additionally also be included. The communications module may provide communications for debug functions, user functions, audio functions, wired functions, wireless functions, or the like. Any number of these circuits, modules, sub-modules, and structures described herein may be included in the administrative function circuitry 120. Any other such means, even those not described herein for brevity, may also be included in the administrative function circuitry 120.

The interrupt processing circuitry 122 is arranged to process planned and unplanned interruptions to normal processing by the microprocessor 112. The interrupts may be synchronous or asynchronous to a system clock. Examples of planned interruptions include expiring timers, certain I/O control circuit inputs (e.g., keypresses, serial or parallel incoming data, and the like). Examples of unplanned interrupts include imminent loss of power interrupts, resets, error traps, watchdog timeouts, and the like. In some embodiments, one or more interrupt controllers operate autonomously from each other, and in other embodiments, one or more interrupt controllers operate cooperatively with each other. In this way, interrupt functionality may be nested, prioritized, dedicated, or implemented in other ways. In some embodiments, any one of the individual interrupt controllers, individual interrupts, or groups thereof may be arranged to invoke operations of a reset control functionality that provides an opportunity to enter a secure engine process of a secure processing environment (see secure processing environment 126). Such a secure processing environment may have multiple modes of operation, including a mode designed to secure boot operations. In some embodiments, the secure processing environment 126 provides secure services in response to requests from unsecure user-applications.

The DMA circuitry 124, also referred to as DMA controller, is configured to provide high-speed data transfer between peripherals and memory as well as memory to memory. The peripherals may include any one or more of the I/O circuitry 118, administrative function circuitry 120, and other memory-type circuitry (e.g., USB host controllers, PCI device, and the like). Memory may include any of the structures of memory 114. Once configured, the DMA circuitry 124 may be used to move data quickly by direct memory access without any further action by microprocessor 112. The DMA circuitry may provide any number of independent, dependent, cooperative, nested, or other channels.

Microprocessor 112 and memory 114 of microcontroller 100 are organized according to a memory space that has a determined "width." The "width" is often based on how much data a given microprocessor 112 can concurrently process, and along these lines, the "width" is often mirrored by the number of data or instruction "bits" concurrently passed over one or more buses that move data or instructions within the microcontroller 100. In some embodiments, microcontroller 100 is organized has having a fixed width of 8-bits, 16-bits, 32-bits, 64-bits, 128-bits, or some other width. In other embodiments, microcontroller 100 is organized as having a default width (e.g., 8-bits, 16-bits, 32-bits, 64-bits, 128-bits, or some other width), and in these embodiments, the operating width of microcontroller 100 may configured to operate according to a different width.

In the illustration of FIG. 2, the microcontroller 100 has a 32-bit wide address architecture, but the inventive subject matter of the present disclosure is not so limited. The inventive aspects described herein may be suitably applied to other microcontroller devices having other microprocessors fixedly or configurably organized according to a different width.

The memory map 116 of FIG. 2 is shown having a 32-bit wide address space spanning four gigabytes (4 GB), addressable using hexadecimal notation counting from 0x0000-0000 to 0xFFFF-FFFF (i.e., 0 to 4,294,967,295 in decimal (base-10) notation). The microprocessor 112 of microcontroller 100 may address any bit, nibble, byte, half-word, word, double-word, quad-word, or the like in the memory map 116. If a designer of microcontroller 100, or if a system engineer implementing microcontroller 100 in a device, locates a device (e.g., a memory, a PCI-bus, a USB host controller, or the like) on a 32-bit memory bus, and if the device has its own individual or set of 32-bit addresses, then the microprocessor 112 will be able to access the device by placing a set of data bits representing the device address on the 32-bit memory bus. Different from a conventional microcontroller (e.g., microcontroller 10 of FIG. 1), some of the unique addresses in the memory map 116 are not fully accessible by the microprocessor 112.

Memory map 116 of FIG. 2 includes one or more protected memory area blocks 132, one or more secure processing blocks 126 and one or more unsecure user-application blocks 128. The memory blocks 126, 128 and 132 may be defined by a manufacturer of the microcontroller 100, an original equipment manufacturer (OEM) of a device that integrates microcontroller 100, or by an end-user (e.g., a programmer) of microcontroller 100, and various combinations thereof. For example, in some cases two or more secure environments 126 may be created, such as one by the manufacturer for facilitating boot operations and another by a programmer for facilitating calls by unsecure user-applications to secure services. Multiple secure environments 126 may be created contiguously in memory 114. Alternatively, or in addition, secure environments 126 may be separate and distinct from each other.

It is recognized that in the embodiment of FIG. 2, boundary lines are illustrative and non-limiting. For example, in some embodiments, the protected memory areas 132 might be integrated with secure processing 126.

In some embodiments the protected memory areas 132 protected by memory protection MP are protected by a memory protection unit or circuit (MPU) 114d, a computer hardware circuit or logic circuitry that provides memory protection. The MPU allows a privileged software to define memory regions and assign memory access permission and memory attributes to each of them. The privileged software may be provided by a manufacturer of microcontroller 100, an original equipment manufacturer (OEM) of a device that integrates microcontroller 100, or by an end-user (e.g., a programmer) of microcontroller 100, or various combinations thereof. A conventional MPU may be subject to attack by applications executing in a privileged mode. For example, such an application may modify an MPU or a DMA configuration using an interrupt during the execution of a secure process, and the firewall which protects memory does not protect sensitive peripheral or hardware registers (e.g., registers of cryptographic circuitry) outside of the memory. The application may thereby gain access to sensitive data stored in or manipulated using the registers.

The secure processing block 126 includes data and secure processing software instructions executable by the microprocessor 112. The secure processing block 126 is responsible for managing secret operations (e.g., access to secure keys, cryptographic algorithms, encryption, decryption, signature verification, and the like) in an otherwise non-secure microcontroller 100. In some embodiments, the secure processing software instructions create a firmware architecture that combines specific mechanisms and strategies, to perform secret functions while protecting secret information (e.g., secure keys, financial information, health information, and the like) in microcontroller 100. These ends may be achieved by combining certain protection mechanisms of microcontroller 100 to create secure operations. In this way, a set of functions performing secure operations (e.g., cryptographic operations, secure keys handling, and read/write of sensitive data) can be shared between independent applications running in different memory areas of a single device. Non-limiting examples of such applications includes a user application such as a banking application, a payment application, and a human identification application to permit physical access to a secure physical space), running on an Internet of Things (IoT) device, a wearable computing device (e.g., sports device, medical device, and the like), an industrial device, an in-vehicle automotive device, a mobile device, and others.

One or more parameters of the secure processing block 126 may be fixed or otherwise arranged at design time by a manufacturer of microcontroller 100. In addition, or in the alternative, one or more other parameters of the secure processing block 126 may be fixed or otherwise arranged at implementation time by an original equipment manufacturer (OEM) that integrates microcontroller 100 in a particular device such as an embedded device. In these or still other embodiments, one or more other parameters of the secure processing block 126 may be fixed or otherwise arranged at run-time by a programmer that creates program functionality or the embedded or other device provided by the OEM. These parameters may be stored in the microcontroller 100 for use by the control circuitry of at least one of the optional memory protection logic 114d and the optional firewall logic 114e.

In order to establish or otherwise implement the secure processing block 126, the associated control circuitry of RAM 114a, FLASH 114b, and the other optional memory-type circuitry 114c may include one or more memory protection mechanisms.

Alternatively, the one or more memory protection mechanisms may be formed in a separate and distinct memory protection logic 114d module. Such mechanisms can be configured to protect portions of memory 114, for example protected memory areas 132, from unwanted access (e.g., read, write, execute, or any combination thereof), which may include theft of secret data, code hacking, or other malicious access.

One type of memory protection mechanism may include dedicated hardware monitoring circuitry to protect volatile or non-volatile areas of memory 114 that store secure processing software instructions. Optionally, a firewall memory protection mechanism may also be implemented in the control circuitry of microcontroller 100. In some embodiments, the firewall memory protection mechanism may be formed in a separate and distinct firewall logic 114e module. Alternatively, if the optional firewall logic is included in microcontroller 100, the firewall protection mechanism may be implemented in the circuits of memory 114, in the administrative function circuitry 120, or in some other location of microcontroller 100.

Firewall logic may be arranged to protect a specified portion of software code or data in either volatile memory, such as in RAM 114a, or non-volatile memory, such as FLASH 114b. The firewall logic may protect the volatile data from errant or malicious program instructions that are fetched from outside the protected area.

The firewall can be programmatically opened and programmatically closed. Program instructions can read or write data in protected areas when the firewall is opened, and program instructions can be fetched from the protected areas when the firewall is opened. Conversely, when the firewall is closed, any access request into the protected area may generate a reset condition, which immediately stops the detected intrusion.

Firewall logic may include snooping circuits, which may be arranged as dedicated, configurable comparators that monitor traffic on one or more address buses within microcontroller 100. Any desired number of firewall comparator circuits and associated parameter configuration logic may be included in microcontroller 100. In some embodiments, each firewall comparator circuit may be configured to protect a different section (e.g., segment, block, page, group, and the like) or memory 114. The configurable comparator circuits may be associated with a set of firewall registers that store configuration parameters for the firewall logic. In some embodiments, one or more firewall control registers define address space protected by the firewall, enable and disable the firewall, control or otherwise direct the actions that will be taken upon unauthorized breach of the firewall, and define other firewall parameters. Accordingly, any number of other functions and functional logic may be associated with Secure Processing block 126. Microcontrollers of the type described in the present disclosure may be employed in retail devices, consumer devices, industrial equipment, medical devices, vehicles, and devices of nearly any other class or technology area. The devices may be battery powered or powered by a hard-wired source. The devices where microcontrollers are employed may be portable, fixed, or some combination thereof. Without any limitation, microcontrollers may be used to take data from sensors of all types (e.g., temperature, time, humidity, acceleration, motion, switches, triggers, and the like), and microcontrollers are used to provide data to the outside world (e.g., visual, audio, and haptic annunciators, switches, triggers, and the like).

Figure 3:
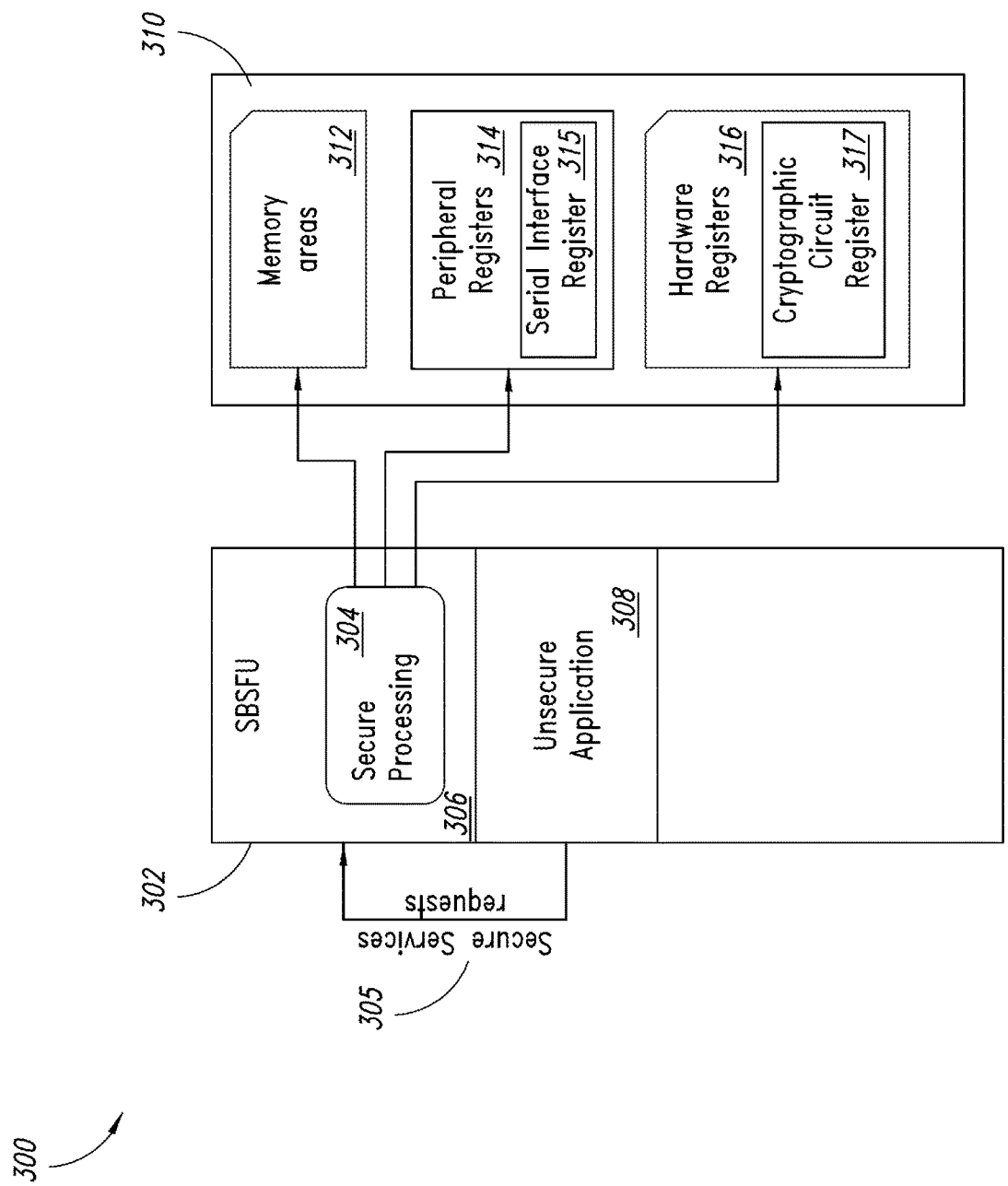
FIG. 3 is a conceptual diagram illustrating an exemplary embodiment of the present disclosure.

FIG. 3 depicts an exemplary embodiment 300 where an unsecure user application 308, which could be vulnerable to an attack, attempts to call a secure processing service 304, by making a secure services request 305. The embodiment 300 may be formed and executed in association with the microcontroller 100 of FIG. 2. The secure service calls may involve requests for access to one or more of protected memory areas 310, as illustrated memory areas 312, one or more sensitive peripheral registers 314, for example, as illustrated a serial interface register 315, and one or more hardware registers 316, for example, as illustrated a cryptographic circuit register. In some embodiments, an unsecure user application 308 may request secure processing to request secure key information, encryption services, decryption services, signature verification, access to secret data stored or to be stored in protected memory area, and other such functionality. In some embodiments the secure processing may be protected by a Firewall.

When the unsecure user application is acting with or acting on secret information, these information areas may be restricted using a firewall and the secure processing 304, that control or prohibit concurrent access to information associated with the protected memory areas 310. The secure processing 304 may be protected by a firewall. Various checks, enablement, disablement, configuration, and the like may be performed with respect to protected memory areas 310, using the associated control circuitry of RAM 114a, FLASH 114b, and the other optional memory-type circuitry 114c, such as the memory protection block 114d. Memory protection mechanisms may be used to provide conditional access to secure data and secure functions associated with the protected memory areas 310. That is, selected functions (e.g., based on their memory address, based on a programmed parameter, or the like) may be permitted to be executed by microprocessor 112, while other functions are prohibited. In addition, some selected memory areas may be prohibited from access entirely, while other selected memory areas are accessible to one or more of the selected secure functions that are permitted to be executed by microprocessor 112. In some embodiments, the access to some memory may be for read only; in some embodiments, the access to some memory may be write only; in some embodiments, the access to some memory may permit reading and writing. Other conditional access may also be configured in association with the protected memory areas 310.

In some embodiments, the manufacturer of microcontroller 100 or an OEM may load non-volatile memory 302 (e.g., FLASH 114b) with all of the parameters that will create and then maintain the secure processing 304. In other embodiments, the manufacturer or the OEM may determine that the secure processing 304 may be updated. Once the secure processing is loaded into non-volatile memory 304 (e.g., FLASH 114b) by the manufacturer of microcontroller 100 or an OEM, it is expected but not required that the secure processing 304 will be updated.

In some embodiments, the secure processing 304 is directed to access memory areas 312 protected by an MPU. In some embodiments, the MPU configures the microcontroller 100 to disable any execution of instructions that were fetched from non-volatile memory (e.g., FLASH 114b). In some embodiments, the MPU is implemented using a particular MPU circuit that monitors an internal addressing architecture of microcontroller 100. Based on the organization of memory 114 (e.g., as exemplified in a memory map 116), the hardware circuit will detect an attempt to pass instructions fetched from non-volatile memory to an execution unit of microprocessor 112. Upon detection of such an unauthorized event, the hardware circuit may prohibit the passage of such instruction or otherwise raise an alert (e.g., interrupt, trap, or the like) that such unauthorized access is occurring. The MPU may also be configured to disable access to all other memory except for that which is expressly permitted. The particular permissions may be based on addresses defined in memory map 116. The particular permissions may have any desirable level of granularity (pages, sections, blocks, words, bytes, and the like), which may even be configurable by a user. In some embodiments, the one or more memory protection (MP) configurations may be maintained by the microprocessor, for example to configure the memory access permissions associated with an MPU.

In some embodiments, the secure processing service 304 is directed to access peripheral registers 314, such as serial interface register 315. In some other embodiments, the secure processing service 304 is directed to access hardware registers 316, such as a cryptographic circuit register 317. In some embodiments, the hardware registers are associated with external hardware to the microcontroller. In some embodiments, the hardware registers are associated with one or more of a cryptographic hardware, a signature verification hardware, or combinations thereof.

As illustrated, the secure processing service 304 is part of a secure boot and secure firmware update (SBSFU) service 306. The SBSFU 306 allows the update of the microcontroller's built-in program with new firmware versions, adding new features and correcting potential issues. The update process may be performed in a secure way to prevent unauthorized updates and access to confidential on-device data.

The secure boot (root of trust services) application of SBSFU 306 may be an immutable code, always executed after a system reset, that checks the microcontroller's static protections, activates the microcontroller's run-time protections and then verifies the authenticity and integrity of user application code before every execution in order to ensure that invalid or malicious code cannot be run.

The secure firmware update application of 306 receives the firmware image via a communication interface, checks its authenticity, and checks the integrity of the code before installing it. The firmware update may be done on the complete firmware image, or only on a portion of the firmware image.

The secure processing service 304, is comprised of a plurality of secure processing software instructions executable by the microprocessor 112, for example, as a state machine. The secure processing software instructions of secure processing 304 are in some embodiments stored in, and fetched from, internal non-volatile memory (e.g., FLASH 14b, 302). In this way, no address or data bus lines are accessible to hardware-based snooping devices. In addition, or in some alternative embodiments, the secure processing 304 may not be updated. In these embodiments, the secure processing 304 is sometimes loaded by the manufacturer of microcontroller 100. In other embodiments, the secure processing 304 may be loaded by an OEM. Fuses or other configuration mechanisms may be employed to physically, electrically, or in some other way prevent updating or otherwise changing the secure processing 304.

As depicted in FIG. 3, the secure processing 304 is a conduit into the protected memory areas (310) for user applications that need to access, read, write, or use the memory areas 312, serial interfaces or other sensitive IP registers 314, and/or hardware registers 316 as part of a request for secure services.

In some embodiments, the subsequent user applications will only regain access to the protected memory areas 310 associated with the request for secure services after the secure processing 304 has cleaned up and deleted or otherwise re-secured the secret information.

In some embodiments, the implementation of the secure processing 304 and unsecure user application 308 permits a plurality of unsecure user applications to coexist and operate serially or concurrently. For example, in some embodiments, the secure processing 304 is arranged as a platform accessible by any number of parties such as an OEM and one or more users.

When a plurality of unsecure user applications are arranged to request secure services from the secure processing 304, the user applications may be arranged such that only a single unsecure user application can access secure functions and data at any given time. In these embodiments, when one unsecure application is obtaining secure services, no other unsecure applications are permitted to access secure services or protected memory areas associated with the access to secure services. Upon completion, unsecure data is re-secured and memory used during the secure operations is cleared. In other embodiments, a plurality of user applications may be arranged such that multiple user applications may access secure functions concurrently, with respective secure memory areas allocated to the respective user applications.

Figure 4:
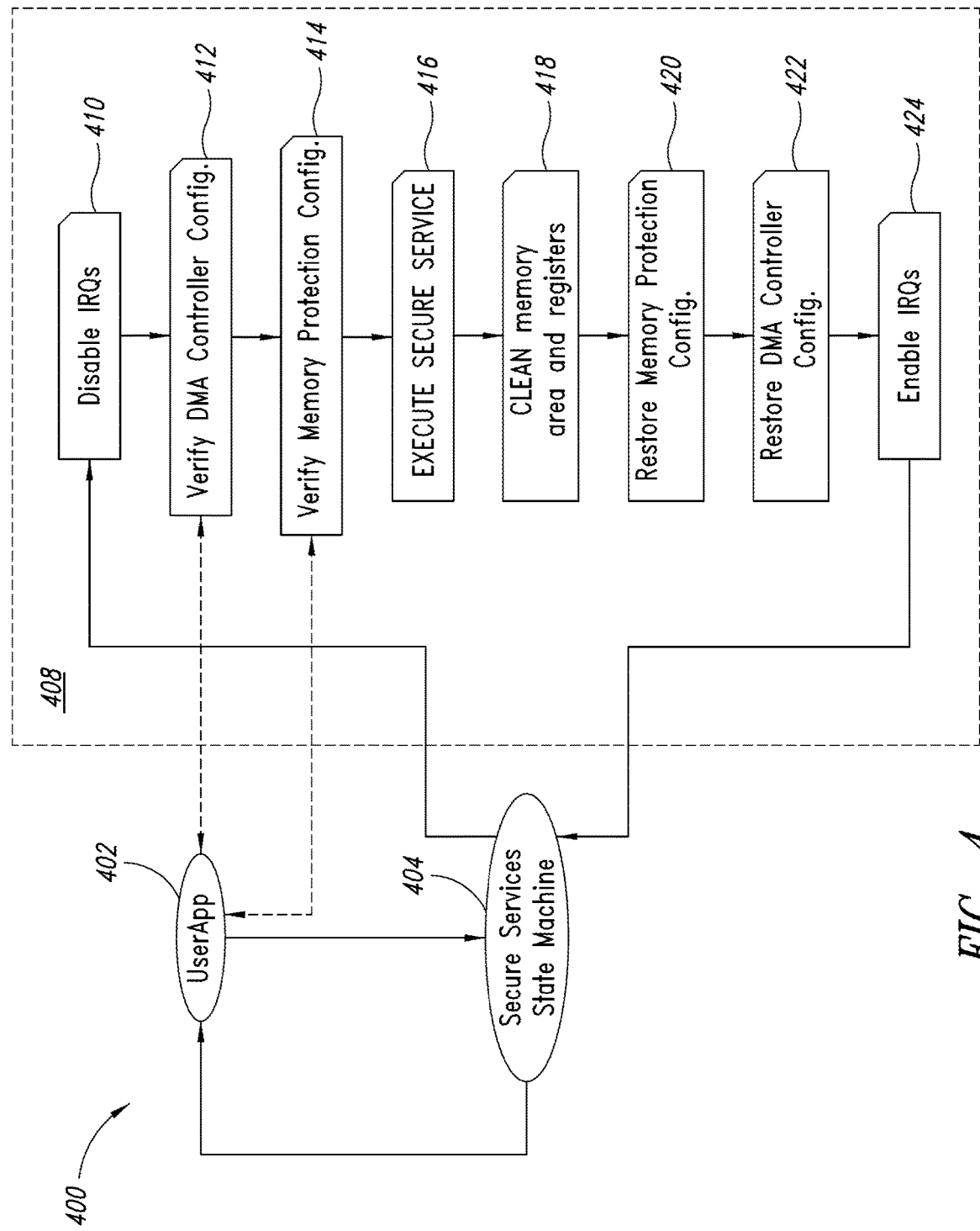
FIG. 4 is a data flow diagram representing an exemplary embodiment of a method of the present disclosure.

FIG. 4 is a data flow diagram representing an embodiment of a method of providing secure services 400. The method 400 may be performed in connection with the embodiment 300 of FIG. 3, and microcontroller 100 of FIG. 2, and is described with reference to FIGS. 2 and 3. In FIG. 4, processing starts at 402, when an unsecure user application (308, 402) makes a secure services request (305) from the secure processing service 304, the request involving access to protected memory areas 310. In some embodiments, the protected memory areas 310 are protected by a memory protection unit (MPU). In some embodiments, the secure processing service 304 is protected by a firewall. The firewall logic is arranged to protect specified programmed software instructions or specified data in either volatile memory or non-volatile memory from attacks using particular snooping circuits.

When receiving secure service call (305) by the unsecure user application (308, 402) to access protected memory areas 310, in an embodiment, the microcontroller executes the operations 408 as a secure services state machine 404. The instructions associated with the secure services state machine 404 are executed by microprocessor 112 and are fetched from non-volatile memory (e.g., FLASH 114b) that is physically located internal to microcontroller 100. That is, in embodiments where microcontroller 100 is arranged as an integrated circuit, the software instructions executable by the microprocessor 112 to implement the secure services state machine 404 are fetched from a physical memory structure inside the integrated circuit package.

In some embodiments, the microcontroller manufacturer or an OEM may load memory 302 with all of the parameters that will create and then maintain the secure processing service 304 and the associated secure services state machine 404. In some embodiments, the manufacturer or the OEM determines that the secure processing service 304 may be updated. Once the secure processing 304 is loaded into non-volatile memory 302 (e.g., FLASH 114b) by the manufacturer of microcontroller 100 or an OEM, it is expected but not required that the secure processing 304 may be updated.

At 410, the state machine 404 disables interrupt requests (IRQs). The state machine 404 proceeds from 410 to 412.

At 412, the state machine 404 verifies one or more DMA controller configurations. For example, the state machine 404 may determine whether one or more direct memory access (DMA) controller configurations satisfy DMA secure-service criteria associated with the secure service request, such as whether a DMA controller configuration restricts access to a protected memory area 310 to be accessed as part of responding to the secure-service request. The areas to which access is to be restricted are associated with the secure service request and may be specific to the secure service request (e.g., the state machine may verify that DMA controller configurations do not permit access to memory and registers to be used during execution of the secure service request). For example, a DMA controller configuration which permits access to protected memory areas to be accessed as part of responding to the secure service request may be determined not to satisfy DMA secure-service criteria associated with the secure-service request.

In some embodiments, the verifying may comprise responding to a failure of a DMA controller configuration to satisfy the DMA secure-service criteria by storing the DMA controller configuration, modifying the DMA controller configuration to conform to the DMA secure-service criteria associated with the secure service request (e.g., to restrict access of the DMA controller to protected memory areas to be accessed during execution of the secure service request) and the cleaning, and restoring the stored DMA controller configuration after the request is executed (and appropriate cleaning is performed). In some embodiments, the verifying may comprise disabling a DMA controller configuration which does not satisfy the DMA secure-service criteria. In some embodiments, the verifying may comprise responding to a failure of a DMA controller configuration to satisfy the DMA secure-service criteria by generating an error message in response to the secure service request from the user application 402 (illustrated by the dashed line between the verifying 412 and the user application 402). The error message may indicate the DMA controller configuration does not satisfy the DMA secure-service criteria. In some embodiments, the executing unsecure user-application 402 may respond to the error message by saving the DMA controller configuration, modifying the DMA controller configuration to restrict access of the DMA controller to the one or more protected memory areas, resubmitting the secure service request and restoring the saved DMA controller configuration after the service request is executed. In some embodiments, the user application 402 may generate a separate secure service request to modify the DMA controller configuration (e.g., the DMA controller configuration may be stored in a protected memory area).

The disabling of DMA controllers or modifying of DMA controller configurations may in some embodiments be implemented via parameters loaded into internal registers of microcontroller 100. Alternatively, or in addition, the disabling or modifying may in some embodiments be implemented in hardware, for example using a particular switch-based (e.g., a transistor-based) circuit.

The state machine 404 proceeds from 412 to 414. At 414, the state machine 404 optionally verifies one or more memory protection (MP) configurations, for example by determining whether the MP configurations satisfy a MP secure-service criteria associated with the secure service request. For example, the state machine 404 may determine whether an MP configuration restricts access to a protected memory area 310 that does not need to be accessed during execution of the secure service request and permits access to a protected memory area as needed to execute the secure services request. The areas to which access is to be restricted are associated with the secure service request and may be specific to the secure service request (e.g., the state machine may verify that MP configurations do not permit access to memory and registers to be used during execution of the secure service request other than by the state machine executing the secure service request).

In some embodiments, the verifying an MP configuration includes responding to a failure of a MP configuration to satisfy the MP secure-service criteria by storing the MP configuration, modifying access permissions of the MP configuration, and restoring the stored MP configuration (e.g., after execution and any appropriate cleaning). In some embodiments, the verifying may include responding to a failure of a MP configuration to satisfy the MP secure-service criteria by generating an error message in response to the secure service request (illustrated by the dashed line between the user application 402 and the verifying 414). The error message may indicate the MP configuration does not satisfy the MP secure-service criteria. In some embodiments, the user application 402 responds to the error message by saving the MP configuration, modifying access permissions of the MP configuration, resubmitting the secure service request, and restoring the saved MP configuration after the secure services is provided. In some embodiments, the user application 402 may generate a separate secure service request to modify the MP configuration (e.g., the MP configuration may be stored in a protected memory area).

In response to successful verifying at 412 and 414, the state machine 404 proceeds to 416. At 416, the state machine 404 executes at least one secure operation associated with a protected memory areas. The protected memory areas may include one or more of: an addressable memory area; an interface register; an IP register; a cryptographic hardware register; a signature verification hardware register; or combinations thereof. In some embodiments, the secure operation comprises one or more of: accessing a communication hardware functions using a corresponding interface register, accessing cryptographic functions using the cryptographic hardware registers, accessing a signature verification functions using a corresponding interface registers, or combinations thereof. The state machine proceeds from 416 to 418.

At 418, the state machine 404 executes operations to clean internal memory areas and registers after performing the at least one secure operation. In some embodiments, all memory areas and registers associated with the secure operation at 416 are cleaned. In some embodiments, only some of the protected memory areas and registers are cleaned (e.g., a hardware register reconfigured as part of the secure services request may not be cleared). The cleaning of the memory areas and registers prevents any malicious code from stealing any sensitive information and data used during the secure operation.

In some embodiments, cleaning areas of non-volatile memory includes programming a selected initialization value (e.g., zero) into the area to be cleared. In some embodiments, all non-volatile memory is cleared. In other embodiments, obfuscation data such as random numbers may be loaded into determined areas of non-volatile memory. And in still other embodiments, memory of the secure processing, which is not freely accessible, may not cleared at all. The state machine 404 proceeds from 418 to 420.

At 420, the state machine 404 optionally restores the MP configuration after cleaning the internal memory areas and registers. In some embodiments, the protected memory areas are protected by the Memory Protection Unit (MPU), and restoring the protected memory configuration includes restoring the MPU configuration. In some embodiments, restoring the MP configuration comprises using a MP configuration stored at 414. The state machine 404 proceeds from 420 to 422.

At 422, the state machine 404 optionally restores DMA controller configurations. In some embodiments, restoring a DMA controller configuration comprises using a DMA controller configuration stored at 412. The state machine 404 proceeds from 422 to 424.

At 424, the state machine 404 optionally enables the interrupt requests (IRQs) disabled at 410. In some embodiments, the control returns back to unsecure user application (308, 402) after enabling the IRQs at 424.

Embodiments of the method 400 may comprise more acts than illustrated in FIG. 4, may comprise fewer acts than illustrated in FIG. 4, may perform acts in various orders, may combine various acts, and may split various acts into multiple acts. For example, act 412 may be performed after act 414, or acts 412 and 414 may be combined in some embodiments.

Figure 5:
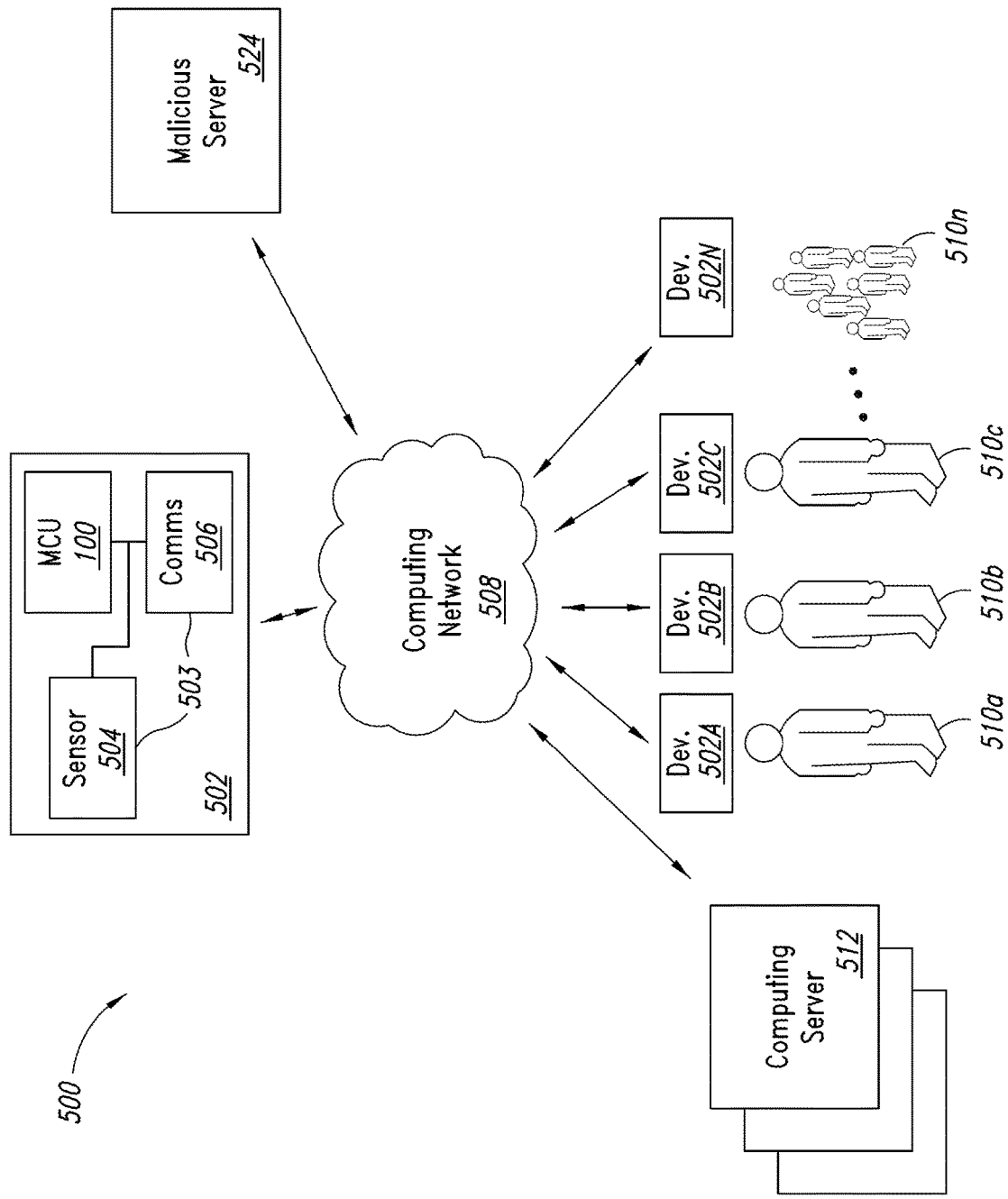
FIG. 5 is a diagram representing an example implementation of a plurality of embodiments.

FIG. 5 is a diagram representing an implementation of a plurality of embodiments of secure microcontrollers 502, 502A to 502N. The embodiments of secure microcontrollers 500 may be formed and executed, for example, in association with the microcontroller 100 of FIG. 2, the embodiment 300 of FIG. 3, and the method of providing secure services 400 of FIG. 4. An end device 502 comprises a microcontroller 100 of the type described in the present disclosure. In some embodiments, the end device 502 comprises functional circuitry 503, as illustrated a sensor 504 and a communications interface 506. In some embodiments, the functional circuitry 503 may include various other functional circuits, such as one or more additional sensors, cryptographic circuitry signature verification circuitry, mathematical operation circuits (e.g., multiply-accumulate circuitry, FPUs, etc.), optional external memories; etc., or various combinations thereof. The end device 502 is arranged to communicate via a network 508. In some embodiments, the device 502 is an IoT device running a user application running on microcontroller 100, connected with a computer network (e.g. internet cloud), and using memory and functional circuitry 503 protected by embodiments of the present disclosure. In some embodiments the protected functional circuitry 503 may be an external accelerator, to make the IoT node faster and more secure.

Along with the end device 502, a plurality of users 510a, 510b, 510c, to 510n are each associated, respectively, with at least one end device 502A, 502B, 502C to 502N. Communication interfaces of the end devices permit the end devices to communicate, via network 508, to other computing devices such as each other, a first computing server 512, a second Malicious server 524, and other computing servers (not shown).

In a non-limiting, non-exhausting way, directional arrows in FIG. 5 illustrate communicative couplings between computing devices and network 508. Other communications and communicative couplings between devices may also be arranged or otherwise included and are not shown so as to simplify the illustration. The communications of FIG. 5 may include communications based on any one or more of a telecommunications (e.g., cellular) protocol, a satellite protocol, a cable-services protocol, an Ethernet protocol, a universal serial bus (USB) protocol, a Bluetooth protocol, a WiFi protocol, a near field communications (NFC) protocol, radio frequency identifier (RFID) protocol, and any other type of wired and wireless data communications protocol.

Network 508 may be a wide area network (WAN) such as the Internet, a local area network (LAN), a personal area network (PAN), a peer-to-peer network, or some other type of network. Various portions and protocols of network 508 may cooperate to provide seamless communications between any of the computing devices of FIG. 5 (e.g., end device 502, computing server 512, and the like). The various portions and protocols of network 508 may include, but are not limited to, any of the protocols employed by any of the computing devices described in the present disclosure.

The end devices of the present disclosure, which include end device 502 and end devices 502A-502N may be any type of end device wherein secure processing is desirably executed in a non-secure microcontroller. Non-exhaustively, in an exemplary and non-limiting list, the end devices of the present disclosure may be mobile computing devices such as wearable computing devices (e.g., fitness devices, personal security device, personal identification devices, and the like), automotive computing device, drones, robots, payment devices, health or other medical devices, and the like; fixed computing devices such as credit card machines, point-of-sale (POS) terminals, public utility meters (e.g., water, electricity, and the like), industrial equipment, home and commercial appliances, heating, ventilation, and air conditioning (HVAC) devices, smart plug devices, smart power devices, and the like; and any other type of computing device where a secure services 400 is desirably formed in a non-secure computing device such as microcontroller 100.

In a secure communications embodiment illustrated in FIG. 5, a secure microcontroller operation is planned for a mobile device such as a payment device. The payment device may be arranged as end device 502, running a user application running on microcontroller 100, connected to the cloud, and using functional circuitry 503 protected by embodiments of the present disclosure. The communications interface 506 in this embodiment may follow a telecommunications protocol, and the functional circuitry 503 may be any type of cryptographic, signature verification or any other kind of circuitry or logic. In some cases of the present embodiment, the functional circuitry 503 may not even be implemented as separate circuitry from the microprocessor 100, and the secure information are accessed from protected memory areas 312.

In this secure communications embodiment, the user application in the secure mobile payment end device 502 may be started by the end device 502, by computing server 512, or by some other source. In some embodiments, the user application running on device 502 might use cryptographic circuitry 503 to encrypt or decrypt data communicated between the user application and other devices connected to the computing network 508, such as end devices 502A-502N, or the computing server 512. In order to secure the communication, the user application makes a secure services call 305 to secure processing 304 running on microcontroller 100. The microcontroller 100 provides the secure services 400, including executing secure services state machine 404, in response to the user application's secure service request, and enables the user application to access hardware registers for cryptographic circuitry 503. The cryptographic hardware 503 registers are secured under the protected memory areas 310. During the secure operations 400, any access to the protected memory areas and hardware registers by a malicious attacker, such as a malicious server 524 or a corrupted device (e.g., a corrupted user device 502n) are prevented.

It is recognized herein that each of the terms, "security keys," "secure keys," "cryptographic keys," "decryption keys," and "encryption keys," and the like have different meanings in particular contexts. The term "secure key" in all of its grammatical forms is used interchangeably with any particular secure key of any particular secure key type as the context allows.

As used in the present disclosure, the term "module" may refer to an electronic circuit, a processor and a memory operative to execute one or more software or firmware programs, combinational logic circuitry, or other suitable components (hardware, software, or hardware and software) that provide the functionality described with respect to the module.

FIGS. 3 and 4 are diagrams illustrating processes or functions that may be used by embodiments of microcontroller 100. In this regard, each described process may represent a module, segment, or portion of code, which comprises one or more executable instructions for implementing the specified logical function(s). It should also be noted that in some implementations, except where an order is expressly stated, the functions noted in the process may occur in a different order, may include additional functions, may occur concurrently, and/or may be omitted.

FIG. 5 illustrates various computing server devices such as computer server 512. These computing server devices include operative hardware found in a conventional computing server apparatus such as one or more central processing units (CPU's), volatile and non-volatile memory, serial and parallel input/output (I/O) circuitry compliant with various standards and protocols, wired and/or wireless networking circuitry (e.g., a communications transceiver).

The described embodiments facilitate improving overall security of a system including one or more microcontrollers, limiting microcontroller MPU vulnerabilities to attack, and reducing constraints on user applications while providing a higher level of protection against internal attacks or bugs of malicious software. In some embodiments, the secure services may be provided in the context of a combination of firewall isolation and an MPU protection strategy.

In an embodiment, a microcontroller comprises a memory, one or more direct memory access (DMA) controllers coupled to the memory, and a microprocessor coupled to the memory. The microprocessor, in operation: maintains one or more memory protection (MP) configurations to control access to protected memory areas of the microcontroller; executes an unsecure user-application; and responds to a secure service call of the executing unsecure user-application. The responding to the secure service call includes disabling interrupt requests; determining whether one or more DMA controller configurations satisfy DMA secure-service criteria associated with the secure service request; determining whether one or more MP configurations satisfy MP secure-service criteria associated with the secure service request; in response to determining the DMA secure-service criteria and the MP secure-service criteria are satisfied: executing at least one secure operation associated with the secure service call, the at least one secure operation accessing at least one protected memory area; and cleaning one or more memory areas accessed during the execution of the at least one secure operation; and enabling the interrupt requests.

In an embodiment, the protected memory areas include: one or more addressable memory areas; one or more peripheral registers; one or more cryptographic circuit registers; one or more signature verification registers; or various combinations thereof. In an embodiment, the microprocessor, in operation, executes a state machine in response to the secure service call, the state machine controlling the response to the secure service call.

In an embodiment, the determining whether a DMA controller configuration satisfies DMA secure-service criteria comprises determining whether the DMA configuration permits access by the DMA controller to one or more of the protected memory areas. In an embodiment, the microprocessor, in operation, responds to a failure of a DMA controller configuration to satisfy the DMA secure-service criteria by: storing the DMA controller configuration; modifying the DMA controller configuration to restrict access of the DMA controller to the one or more protected memory areas during the executing and the cleaning; and restoring the stored DMA controller configuration after the cleaning. In an embodiment, the modifying the DMA controller configuration comprises disabling the DMA controller configuration. In an embodiment, the microprocessor, in operation, responds to a failure of a DMA controller configuration to satisfy the DMA secure-service criteria by generating an error message in response to the secure service request, the error message indicating the DMA controller configuration does not satisfy the DMA secure-service criteria. In an embodiment, the executing unsecure user-application responds to the error message by: saving the DMA controller configuration; modifying the DMA controller configuration to restrict access of the DMA controller to the one or more protected memory areas; resubmitting the secure service request; and restoring the saved DMA controller configuration.

In an embodiment, the determining whether a MP configuration satisfies the MP secure-service criteria comprises determining whether the MP configuration permits access to one or more of the protected memory areas. In an embodiment, the microprocessor, in operation, responds to a failure of a MP configuration to satisfy the MP secure-service criteria by: storing the MP configuration; modifying access permissions of the MP configuration; and restoring the stored memory protection configuration after the cleaning. In an embodiment, the microprocessor, in operation, responds to a failure of a MP configuration to satisfy the MP secure-service criteria by generating an error message in response to the secure service request, the error message indicating the MP configuration does not satisfy the MP secure-service criteria. In an embodiment, the executing unsecure user-application responds to the error message by: saving the MP configuration; modifying access permissions of the MP configuration; resubmitting the secure service request; and restoring the saved MP configuration.

In an embodiment, the microprocessor, in operation, responds to a failure of a configuration to satisfy secure-service criteria by generating an error message in response to the secure service request, the error message indicating the configuration does not satisfy secure-service criteria; and the executing unsecure user-application responds to the error message by submitting a second secure service request, the second secure service request including a request to modify the configuration to satisfy the secure-service criteria. In an embodiment, microcontroller comprises memory protection circuitry to protect the protected areas in accordance with the maintained one or more MP configurations.

In an embodiment, the at least one secure operation includes: accessing sensitive data; a signature verification function; a cryptographic operation; or combinations thereof.

In an embodiment, the performing at least one secure operation includes generating a response to the secure service call.

In an embodiment, a method comprises: maintaining, under control of a microprocessor of a microcontroller having a memory and one or more direct memory access controllers, one or more memory protection (MP) configurations to control access to protected memory areas of the microcontroller; executing an unsecure user-application; and responding, under control of the microprocessor, to a secure service call of the executing unsecure user-application by: disabling interrupt requests; determining whether one or more DMA controller configurations satisfy DMA secure-service criteria associated with the secure service request; determining whether one or more MP configurations satisfy MP secure-service criteria associated with the secure service request; in response to determining the DMA secure-service criteria and the MP secure-service criteria are satisfied: executing at least one secure operation associated with the secure service call, the at least one secure operation accessing at least one protected memory area; and cleaning one or more memory areas accessed during the execution of the at least one secure operation; and enabling the interrupt requests. In an embodiment, the protected memory areas include: one or more addressable memory areas; one or more peripheral registers; one or more cryptographic circuit registers; one or more signature verification registers; or various combinations thereof. In an embodiment, the determining whether a DMA controller configuration satisfies DMA secure-service criteria comprises determining whether the DMA configuration permits access by the DMA controller to one or more of the protected memory areas. In an embodiment, the method comprises responding to a failure of a DMA controller configuration to satisfy the DMA secure-service criteria by: storing the DMA controller configuration; modifying the DMA controller configuration to restrict access of the DMA controller to the one or more protected memory areas during the executing and the cleaning; and restoring the stored DMA controller configuration after the cleaning. In an embodiment, the method comprises responding to a failure of a DMA controller configuration to satisfy the DMA secure-service criteria by generating an error message in response to the secure service request, the error message indicating the DMA controller configuration does not satisfy the DMA secure-service criteria. In an embodiment, the determining whether a MP configuration satisfies the MP secure-service criteria comprises determining whether the MP configuration permits access to one or more of the protected memory areas. In an embodiment, the method comprises responding to a failure of a MP configuration to satisfy the MP secure-service criteria by: storing the MP configuration; modifying access permissions of the MP configuration; and restoring the stored memory protection configuration after the cleaning. In an embodiment, the at least one secure operation includes: accessing sensitive data; a signature verification function; a cryptographic operation; or combinations thereof. In an embodiment, the method comprises executing, under control of the microprocessor, a state machine to control the responding to the secure service call.

In an embodiment, a system comprises: a system bus; one or more functional circuits coupled to the system bus; and a microcontroller coupled to the system bus. The microcontroller includes: a memory; one or more direct memory access (DMA) controllers coupled to the memory; and a microprocessor coupled to the memory. The microprocessor, in operation: maintains one or more memory protection (MP) configurations to control access to protected memory areas of the microcontroller; executes an unsecure user-application; and responds to a secure service call of the executing unsecure user-application. The responding includes, under control of the microprocessor: disabling interrupt requests; determining whether one or more DMA controller configurations satisfy DMA secure-service criteria associated with the secure service request; determining whether one or more MP configurations satisfy MP secure-service criteria associated with the secure service request; in response to determining the DMA secure-service criteria and the MP secure-service criteria are satisfied: executing at least one secure operation associated with the secure service call, the at least one secure operation accessing at least one protected memory area; and cleaning one or more memory areas accessed during the execution of the at least one secure operation; and enabling the interrupt requests. In an embodiment, the protected memory areas include: one or more addressable memory areas; one or more peripheral circuit registers; one or more cryptographic circuit registers; one or more signature verification registers; or various combinations thereof. In an embodiment, the system comprising an integrated circuit, and the microcontroller and one or more peripheral circuits are embedded in the integrated circuit.

In an embodiment, a non-transitory computer-readable medium's contents configure a microcontroller to perform a method, the method comprising: maintaining, under control of a microprocessor of the microcontroller, the microcontroller having a memory and one or more direct memory access controllers, one or more memory protection (MP) configurations to control access to protected memory areas of the microcontroller; executing an unsecure user-application; and responding, under control of the microprocessor, to a secure service call of the executing unsecure user-application by: disabling interrupt requests; determining whether one or more DMA controller configurations satisfy DMA secure-service criteria associated with the secure service request; determining whether one or more MP configurations satisfy MP secure-service criteria associated with the secure service request; in response to determining the DMA secure-service criteria and the MP secure-service criteria are satisfied: executing at least one secure operation associated with the secure service call, the at least one secure operation accessing at least one protected memory area; and cleaning one or more memory areas accessed during the execution of the at least one secure operation; and enabling the interrupt requests. In an embodiment, the contents comprise instructions, which when executed by the microcontroller, cause the microcontroller to perform the method.

As known by one skilled in the art, a computing server has one or more memories, and each memory comprises any combination of volatile and non-volatile computer-readable media for reading and writing. Volatile computer-readable media includes, for example, random access memory (RAM). Non-volatile computer-readable media includes, for example, read only memory (ROM), magnetic media such as a hard-disk, an optical disk drive, a flash memory device, a CD-ROM, and/or the like. In some embodiments, a particular memory is separated virtually or physically into separate areas, such as a first memory, a second memory, a third memory, etc. In these embodiments, it is understood that the different divisions of memory may be in different devices or embodied in a single memory.

Computing servers further include operative software found in a conventional computing server such as an operating system, software drivers to direct operations through the I/O circuitry, networking circuitry, and other peripheral component circuitry. In addition, computing servers include operative application software such as network software for communicating with other computing devices, database software for building and maintaining databases, and task management software for distributing the communication and/or operational workload amongst various CPU's. In some embodiments, the computing servers described in the present disclosure are a single hardware machine having the hardware and software listed herein, and in other embodiments, the computing servers are a networked collection of hardware and software machines working together in a server farm to execute at least some of functions described in the present disclosure.

When so arranged as described herein, each computing device described in the present disclosure may be transformed from a generic and unspecific computing device to a combination device comprising hardware and software configured for a specific and particular purpose.

In the foregoing description, certain specific details are set forth to provide a thorough understanding of various disclosed embodiments. However, one skilled in the relevant art will recognize that embodiments may be practiced without one or more of these specific details, or with other methods, components, materials, etc. In other instances, well-known structures associated with electronic and computing systems including client and server computing systems, as well as networks have not been shown or described in detail to avoid unnecessarily obscuring descriptions of the embodiments.

Unless the context requires otherwise, throughout the specification and claims which follow, the word "comprise" and variations thereof, such as, "comprises" and "comprising," are to be construed in an open, inclusive sense, e.g., "including, but not limited to."

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content and context clearly dictates otherwise. It should also be noted that the conjunctive terms, "and" and "or" are generally employed in the broadest sense to include "and/or" unless the content and context clearly dictates inclusivity or exclusivity as the case may be. In addition, the composition of "and" and "or" when recited herein as "and/or" is intended to encompass an embodiment that includes all of the associated items or ideas and one or more other alternative embodiments that include fewer than all of the associated items or ideas.

The headings and Abstract of the Disclosure provided herein are for convenience only and do not limit or interpret the scope or meaning of the embodiments.

The various embodiments described above can be combined to provide further embodiments. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A microcontroller, comprising:
 a memory;
 one or more direct memory access (DMA) controllers coupled to the memory; and a microprocessor coupled to the memory, wherein the microprocessor, in operation:
  maintains one or more memory protection (MP) configurations to control access to protected memory areas of the microcontroller;
  executes an unsecure user-application; and
  responds to a secure service call of the executing unsecure user-application by:
    disabling interrupt requests;
    determining whether one or more DMA controller configurations satisfy DMA secure-service criteria associated with the secure service request, wherein the determining whether a DMA controller configuration satisfies DMA secure-service criteria comprises determining whether the DMA configuration permits access by the DMA controller to one or more of the protected memory areas;
    determining whether one or more MP configurations satisfy MP secure-service criteria associated with the secure service request;
    in response to determining the DMA secure-service criteria and the MP secure-service criteria are satisfied:
      executing at least one secure operation associated with the secure service call, the at least one secure operation accessing at least one protected memory area; and
      cleaning one or more memory areas accessed during the execution of the at least one secure operation; and
    enabling the interrupt requests, wherein the microprocessor, in operation, responds to a failure of a DMA controller configuration to satisfy the DMA secure-service criteria by:
  storing the DMA controller configuration;
  modifying the DMA controller configuration to restrict access of the DMA controller to the one or more protected memory areas during the executing and the cleaning; and
  restoring the stored DMA controller configuration after the cleaning.

2. The microcontroller of claim 1 wherein the protected memory areas include:
  one or more addressable memory areas;
  one or more peripheral registers;
  one or more cryptographic circuit registers;
  one or more signature verification registers; or
  various combinations thereof.

3. The microcontroller of claim 1, wherein the microprocessor, in operation, executes a state machine in response to the secure service call, the state machine controlling the response to the secure service call.

4. The microcontroller of claim 1, wherein the modifying the DMA controller configuration comprises disabling the DMA controller configuration.

5. The microcontroller of claim 1, wherein the microprocessor, in operation, responds to a failure of a DMA controller configuration to satisfy the DMA secure-service criteria by generating an error message in response to the secure service request, the error message indicating the DMA controller configuration does not satisfy the DMA secure-service criteria.

6. The microcontroller of claim 1, wherein the determining whether a MP configuration satisfies the MP secure-service criteria comprises determining whether the MP configuration permits access to one or more of the protected memory areas.

7. The microcontroller of claim 6, wherein the microprocessor, in operation, responds to a failure of a MP configuration to satisfy the MP secure-service criteria by generating an error message in response to the secure service request, the error message indicating the MP configuration does not satisfy the MP secure-service criteria.

8. The microcontroller of claim 1, comprising memory protection circuitry to protect the protected memory areas in accordance with the maintained one or more MP configurations.

9. The microcontroller of claim 1, wherein the at least one secure operation includes:
  accessing sensitive data;
  a signature verification function;
  a cryptographic operation; or
  combinations thereof.

10. The microcontroller of claim 1, wherein the performing at least one secure operation includes generating a response to the secure service call.

11. A microcontroller, comprising:
  a memory;
  one or more direct memory access (DMA) controllers coupled to the memory; and
  a microprocessor coupled to the memory, wherein the microprocessor, in operation:
    maintains one or more memory protection (MP) configurations to control access to protected memory areas of the microcontroller;
    executes an unsecure user-application; and
    responds to a secure service call of the executing unsecure user-application by:
      disabling interrupt requests;
      determining whether one or more DMA controller configurations satisfy DMA secure-service criteria associated with the secure service request
      determining whether one or more MP configurations satisfy MP secure-service criteria associated with the secure service request
      in response to determining the DMA secure-service criteria and the MP secure-service criteria are satisfied:
        executing at least one secure operation associated with the secure service call, the at least one secure operation accessing at least one protected memory area; and
        cleaning one or more memory areas accessed during the execution of the at least one secure operation; and
      enabling the interrupt requests, wherein,
    the microprocessor, in operation, responds to a failure of a DMA controller configuration to satisfy the DMA secure-service criteria by generating an error message in response to the secure service request, the error message indicating the DMA controller configuration does not satisfy the DMA secure-service criteria, and
    the executing unsecure user-application responds to the error message by:
      saving the DMA controller configuration;
      modifying the DMA controller configuration to restrict access of the DMA controller to the one or more protected memory areas;
      resubmitting the secure service request; and
      restoring the saved DMA controller configuration.

12. The microcontroller of claim 11 wherein the determining whether a DMA controller configuration satisfies DMA secure-service criteria comprises determining whether the DMA configuration permits access by the DMA controller to one or more of the protected memory areas.

13. The microcontroller of claim 12 wherein the microprocessor, in operation, responds to a failure of a DMA controller configuration to satisfy the DMA secure-service criteria by:
storing the DMA controller configuration;
modifying the DMA controller configuration to restrict access of the DMA controller to the one or more protected memory areas during the executing and the cleaning; and
restoring the stored DMA controller configuration after the cleaning.

14. A microcontroller, comprising:
a memory;
one or more direct memory access (DMA) controllers coupled to the memory; and
a microprocessor coupled to the memory, wherein the microprocessor, in operation:
maintains one or more memory protection (MP) configurations to control access to protected memory areas of the microcontroller;
executes an unsecure user-application; and
responds to a secure service call of the executing unsecure user-application by:
disabling interrupt requests;
determining whether one or more DMA controller configurations satisfy DMA secure-service criteria associated with the secure service request
determining whether one or more MP configurations satisfy MP secure-service criteria associated with the secure service request
in response to determining the DMA secure-service criteria and the MP secure-service criteria are satisfied:
executing at least one secure operation associated with the secure service call, the at least one secure operation accessing at least one protected memory area; and
cleaning one or more memory areas accessed during the execution of the at least one secure operation; and
enabling the interrupt requests, wherein,
the determining whether a MP configuration satisfies the MP secure-service criteria comprises determining whether the MP configuration permits access to one or more of the protected memory areas,
the microprocessor, in operation, responds to a failure of a MP configuration to satisfy the MP secure-service criteria by:
storing the MP configuration;
modifying access permissions of the MP configuration; and
restoring the stored memory protection configuration after the cleaning.

15. A microcontroller, comprising:
a memory;
one or more direct memory access (DMA) controllers coupled to the memory; and
a microprocessor coupled to the memory, wherein the microprocessor, in operation:
maintains one or more memory protection (MP) configurations to control access to protected memory areas of the microcontroller;
executes an unsecure user-application; and
responds to a secure service call of the executing unsecure user-application by:
disabling interrupt requests;
determining whether one or more DMA controller configurations satisfy DMA secure-service criteria associated with the secure service request
determining whether one or more MP configurations satisfy MP secure-service criteria associated with the secure service request
in response to determining the DMA secure-service criteria and the MP secure-service criteria are satisfied:
executing at least one secure operation associated with the secure service call, the at least one secure operation accessing at least one protected memory area; and
cleaning one or more memory areas accessed during the execution of the at least one secure operation; and
enabling the interrupt requests, wherein,
the determining whether a MP configuration satisfies the MP secure-service criteria comprises determining whether the MP configuration permits access to one or more of the protected memory areas,
the microprocessor, in operation, responds to a failure of a MP configuration to satisfy the MP secure-service criteria by generating an error message in response to the secure service request, the error message indicating the MP configuration does not satisfy the MP secure-service criteria, and
the executing unsecure user-application responds to the error message by:
saving the MP configuration;
modifying access permissions of the MP configuration;
resubmitting the secure service request; and
restoring the saved MP configuration.

16. A microcontroller, comprising:
a memory;
one or more direct memory access (DMA) controllers coupled to the memory; and
a microprocessor coupled to the memory, wherein the microprocessor, in operation:
maintains one or more memory protection (MP) configurations to control access to protected memory areas of the microcontroller;
executes an unsecure user-application; and
responds to a secure service call of the executing unsecure user-application by:
disabling interrupt requests;
determining whether one or more DMA controller configurations satisfy DMA secure-service criteria associated with the secure service request
determining whether one or more MP configurations satisfy MP secure-service criteria associated with the secure service request
in response to determining the DMA secure-service criteria and the MP secure-service criteria are satisfied:
executing at least one secure operation associated with the secure service call, the at least one secure operation accessing at least one protected memory area; and
cleaning one or more memory areas accessed during the execution of the at least one secure operation; and
enabling the interrupt requests, wherein:
the microprocessor, in operation, responds to a failure of a configuration to satisfy secure-service criteria by generating an error message in response to the secure service request, the error message indicating the configuration does not satisfy secure-service criteria; and
the executing unsecure user-application responds to the error message by submitting a second secure service request, the second secure service request including a request to modify the configuration to satisfy the secure-service criteria.

17. A method, comprising:
maintaining, under control of a microprocessor of a microcontroller having a memory and one or more direct memory access controllers, one or more memory protection (MP) configurations to control access to protected memory areas of the microcontroller;
executing an unsecure user-application; and
responding, under control of the microprocessor, to a secure service call of the executing unsecure user-application by:
disabling interrupt requests;
determining whether one or more DMA controller configurations satisfy DMA secure-service criteria associated with the secure service request;
determining whether one or more MP configurations satisfy MP secure-service criteria associated with the secure service request;
in response to determining the DMA secure-service criteria and the MP secure-service criteria are satisfied:
executing at least one secure operation associated with the secure service call, the at least one secure operation accessing at least one protected memory area; and
cleaning one or more memory areas accessed during the execution of the at least one secure operation; and
enabling the interrupt requests, wherein,
the determining whether a MP configuration satisfies the MP secure-service criteria comprises determining whether the MP configuration permits access to one or more of the protected memory areas, and
the method comprises responding to a failure of a MP configuration to satisfy the MP secure-service criteria by:
storing the MP configuration;
modifying access permissions of the MP configuration; and
restoring the stored memory protection configuration after the cleaning.

18. The method of claim 17, wherein the protected memory areas include:
one or more addressable memory areas;
one or more peripheral registers;
one or more cryptographic circuit registers;
one or more signature verification registers; or
various combinations thereof.

19. The method of claim 17, wherein the determining whether a DMA controller configuration satisfies DMA secure-service criteria comprises determining whether the DMA configuration permits access by the DMA controller to one or more of the protected memory areas.

20. The method of claim 17, comprising responding to a failure of a DMA controller configuration to satisfy the DMA secure-service criteria by generating an error message in response to the secure service request, the error message indicating the DMA controller configuration does not satisfy the DMA secure-service criteria.

21. The method of claim 17 wherein the at least one secure operation includes:

accessing sensitive data;
a signature verification function;
a cryptographic operation; or
combinations thereof.

22. The method of claim 17, comprising executing, under control of the microprocessor, a state machine to control the responding to the secure service call.

23. A method, comprising:
maintaining, under control of a microprocessor of a microcontroller having a memory and one or more direct memory access controllers, one or more memory protection (MP) configurations to control access to protected memory areas of the microcontroller;
executing an unsecure user-application; and
responding, under control of the microprocessor, to a secure service call of the executing unsecure user-application by:
disabling interrupt requests;
determining whether one or more DMA controller configurations satisfy DMA secure-service criteria associated with the secure service request
determining whether one or more MP configurations satisfy MP secure-service criteria associated with the secure service request
in response to determining the DMA secure-service criteria and the MP secure-service criteria are satisfied:
executing at least one secure operation associated with the secure service call, the at least one secure operation accessing at least one protected memory area; and
cleaning one or more memory areas accessed during the execution of the at least one secure operation; and
enabling the interrupt requests, wherein,
the determining whether a DMA controller configuration satisfies DMA secure-service criteria comprises determining whether the DMA configuration permits access by the DMA controller to one or more of the protected memory areas, and
the method comprises comprising responding to a failure of a DMA controller configuration to satisfy the DMA secure-service criteria by:
storing the DMA controller configuration;
modifying the DMA controller configuration to restrict access of the DMA controller to the one or more protected memory areas during the executing and the cleaning; and
restoring the stored DMA controller configuration after the cleaning.

24. The method of claim 23, wherein the determining whether a MP configuration satisfies the MP secure-service criteria comprises determining whether the MP configuration permits access to one or more of the protected memory areas.

25. The method of claim 24, comprising responding to a failure of a MP configuration to satisfy the MP secure-service criteria by:
storing the MP configuration;
modifying access permissions of the MP configuration; and
restoring the stored memory protection configuration after the cleaning.

26. A system, comprising:
a system bus;
one or more functional circuits coupled to the system bus; and a microcontroller coupled to the system bus, the microcontroller including:
a memory;
one or more direct memory access (DMA) controllers coupled to the memory; and
a microprocessor coupled to the memory, wherein the microprocessor, in operation:
maintains one or more memory protection (MP) configurations to control access to protected memory areas of the microcontroller;
executes an unsecure user-application; and
responds to a secure service call of the executing unsecure user-application by, under control of the microprocessor:
disabling interrupt requests;
determining whether one or more DMA controller configurations satisfy DMA secure-service criteria associated with the secure service request;
determining whether one or more MP configurations satisfy MP secure-service criteria associated with the secure service request;
in response to determining the DMA secure-service criteria and the MP secure-service criteria are satisfied:
executing at least one secure operation associated with the secure service call, the at least one secure operation accessing at least one protected memory area; and
cleaning one or more memory areas accessed during the execution of the at least one secure operation; and
enabling the interrupt requests, wherein
the microprocessor, in operation, responds to a failure of a configuration to satisfy secure-service criteria by generating an error message in response to the secure service request, the error message indicating the configuration does not satisfy secure-service criteria; and
the executing unsecure user-application responds to the error message by submitting a second secure service request, the second secure service request including a request to modify the configuration to satisfy the secure-service criteria.

27. The system of claim 26 wherein the protected memory areas include:
one or more addressable memory areas;
one or more peripheral circuit registers;
one or more cryptographic circuit registers;
one or more signature verification registers; or
various combinations thereof.

28. The system of claim 26, comprising an integrated circuit, wherein the microcontroller and one or more peripheral circuits are embedded in the integrated circuit.

29. A non-transitory computer-readable medium having contents which configure a microcontroller to perform a method, the method comprising:
maintaining, under control of a microprocessor of the microcontroller, the microcontroller having a memory and one or more direct memory access controllers, one or more memory protection (MP) configurations to control access to protected memory areas of the microcontroller;
executing an unsecure user-application; and
responding, under control of the microprocessor, to a secure service call of the executing unsecure user-application by:
disabling interrupt requests;
determining whether one or more DMA controller configurations satisfy DMA secure-service criteria associated with the secure service request;
determining whether one or more MP configurations satisfy MP secure-service criteria associated with the secure service request;
in response to determining the DMA secure-service criteria and the MP secure-service criteria are satisfied:
executing at least one secure operation associated with the secure service call, the at least one secure operation accessing at least one protected memory area; and
cleaning one or more memory areas accessed during the execution of the at least one secure operation; and
enabling the interrupt requests, wherein
the microprocessor, in operation, responds to a failure of a configuration to satisfy secure-service criteria by generating an error message in response to the secure service request, the error message indicating the configuration does not satisfy secure-service criteria; and
the executing unsecure user-application responds to the error message by submitting a second secure service request, the second secure service request including a request to modify the configuration to satisfy the secure-service criteria.

30. The non-transitory computer-readable storage medium of claim 29, wherein the contents comprise instructions, which when executed by the microcontroller, cause the microcontroller to perform the method.

* * * * *

UNITED STATES PATENT AND TRADEMARK OFFICE
CERTIFICATE OF CORRECTION

| | | |
|---|---|---|
| PATENT NO. | : 11,921,655 B2 | Page 1 of 1 |
| APPLICATION NO. | : 17/307893 | |
| DATED | : March 5, 2024 | |
| INVENTOR(S) | : Massimo Panzica et al. | |

It is certified that error appears in the above-identified patent and that said Letters Patent is hereby corrected as shown below:

In the Claims

Column 26, Claim 11, Line 36:
"service request" should read: --service request;--.

Column 26, Claim 11, Line 39:
"service request" should read: --service request;--.

Column 27, Claim 14, Line 29:
"service request" should read: --service request;--.

Column 27, Claim 14, Line 32:
"service request" should read: --service request;--.

Column 28, Claim 15, Line 4:
"service request" should read: --service request;--.

Signed and Sealed this
Thirtieth Day of April, 2024

Katherine Kelly Vidal
*Director of the United States Patent and Trademark Office*